Mar. 27, 1923.
O. C. RUSSELL
TIRE GUARD
Filed July 22, 1922
1,449,913
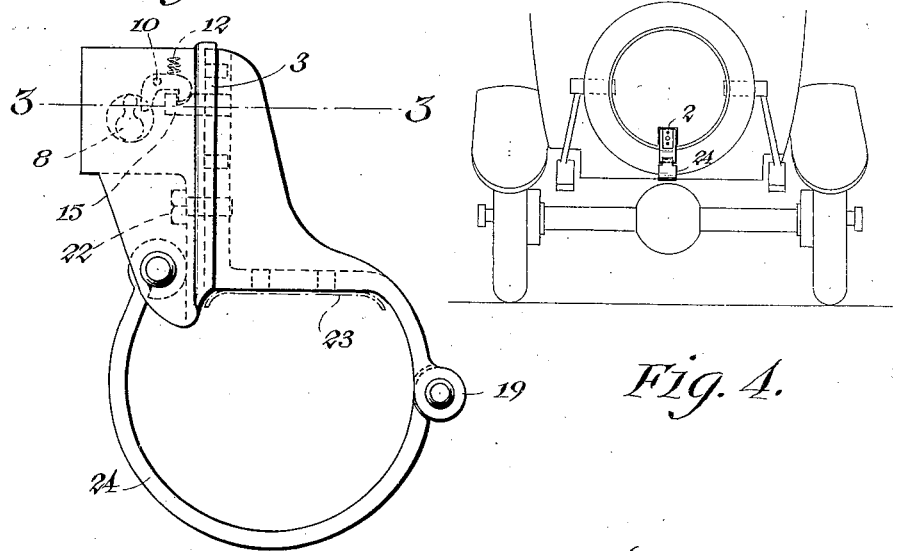
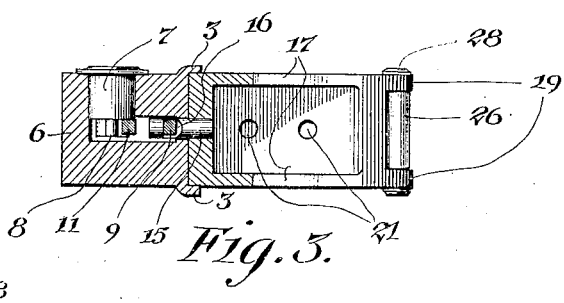
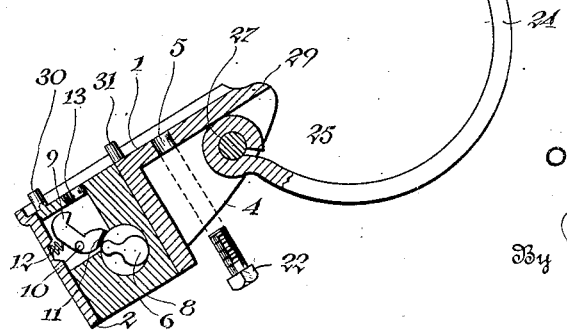
Inventor
ORIN CLARENCE RUSSELL
By William C. Linton
Attorney Patented Mar. 27, 1923.

1,449,913

UNITED STATES PATENT OFFICE.

ORIN CLARENCE RUSSELL, OF OMAHA, NEBRASKA.

TIRE GUARD.

Application filed July 22, 1922. Serial No. 576,805.

*To all whom it may concern:*

Be it known that I, ORIN CLARENCE RUSSELL, a citizen of the United States of America, residing at Omaha, in the county of Douglas and State of Nebraska, have invented certain new and useful Improvements in Tire Guards; and I do hereby declare that the following is a full, clear, concise, and exact description of the invention, such as will enable others skilled in the art to which it appertains to make and use the same.

This invention relates to improvements in automobile tire guards, having for an object to provide a tire guard which, when engaged about the spare tire of an automobile and the rim carrying the same, will prevent unauthorized removal thereof.

It is also an object of the invention to provide a tire guard which may have the size of its tire encircling member changed in order that the device might be used upon different sizes of tires.

Yet another object of the invention is to provide the guard with a novel form of lock whereby the free extremity of the tire encircling portion may be secured in a closed position in a manner to prevent tampering with the lock mechanism or exposure of the same to dirt, dust or the elements.

Other objects will be in part obvious and in part pointed out hereinafter.

In order that the invention and its mode of operation may be readily understood by one skilled in the art, I have in the accompanying illustrative drawings and in the detailed following description based thereon, set out one possible embodiment of the same.

In these drawings:

Figure 1 is a side elevation of the improved guard;

Figure 2 is a longitudinal section through the locking means of the guard showing the same in open position;

Figure 3 is a longitudinal section taken at substantially right angles to the Figure 2 and on line 3—3 of Figure 1; and, Figure 4 is a fragmentary detail in end elevation of a motor driven vehicle showing the improved guard engaged about the spare tire thereof and the rim carrying the same.

Having more particular reference to the drawings, in connection with which like characters of reference will designate corresponding parts throughout, the improved guard may be stated to comprise a movable arm generally indicated by the numeral 1 having a circular bearing sleeve 2 formed in the upper end thereof while marginally disposed strips 3 are arranged adjacent the flat inner side of said arm as clearly shown in the Figures 2 and 3. This arm 1, if desired, may be of cast metal and to reenforce it as well as to provide means for effecting connection with the tire encircling member, hereinafter more fully described, I preferably form webs 4 upon the opposite sides thereof as shown in the Figures 1 and 2. An opening 5 is formed in the lower portion of the arm 1 directly below the circular bearing sleeve 2, the purpose of which will be hereinafter more fully described.

Immovably received in the circular bearing sleeve 2 of the arm 1 is a lock mechanism receiving and supporting cylinder 6 having portions thereof cut away as clearly shown in the Figure 2 and receiving in one of these cut away portions a rotatable valve 7 carrying a cam-like rotatable coupler 8 upon its inner end. The valve 7, of course, is provided with a suitable key way and tumbler mechanism, common in the art, whereby rotation thereof by a properly fitted key will be permitted. A catch or dog 9 is pivotally mounted as at 10 in the remaining cut away portion of the lock cylinder 6 and has a bearing surface 11 formed on one end of the same adapted to be engaged by the cam 8 during rotation of the valve 7 with insertion of a properly fitted key therein. With rotation of the cam 8 in proper direction under influence of the key, it will be noted, upon reference to the Figure 2, that a portion of the same will engage the bearing portion 11 of the catch 9 and swing the outer end of said catch upwardly against the tension of an expansible coiled spring 12 seated in a suitable pocket formed in the upper side of the circular bearing sleeve 2 and engaging an adjacent portion of said catch. With the outer end of the catch 9 in its raised or uppermost position, the lock will be in open position and in consequence, free entry or exit of the particular hasp employed by way of the opening 13 will be permitted.

A substantially right angularly formed immovable arm 14 is provided the device and carries thereon a laterally extending shank or hasp 15 having a portion thereof notched as indicated at 16 and adapted to be received through the opening 13 and engaged with the spring pressed pivoted catch 9 carried by the movable arm 1. This arm 14 is likewise preferably formed of cast metal and to lend to its stability, bracing webs 17 are formed upon the opposite sides thereof in the manner shown in the Figure 2. Also, a downwardly curved extension 18 is formed upon the inner end of the right angular arm and is provided with suitable bearing sleeves 19. Screw threaded openings 20 and 21 are formed in the several angular portions of the arm 14, the opening 20 being adapted to align with the opening 5 whereby to receive a tie-bolt 22 therein, in order that a connection may be effected as between the several arms 1 and 14 and thereby lessen the straining of the mechanism of the locking device. The openings 21 are adapted to receive screws or similar devices therethrough which in turn are engaged in the carrier rim 23 secured to the body of a vehicle, thereby supporting the device.

A semi-circular tire encircling arm or member 24 is provided the device and has bearing sleeves 25 and 26 formed upon its opposite ends, the bearing sleeve 25 being positioned between the oppositely disposed webs 4 on the movable arm 1 to receive a pivot pin supported thereon and indicated by the numeral 27 through the same. The sleeve 26 is adapted to be positioned intermediately of the bearing sleeve 9 whereupon a pivot pin 28 is passed through the same. By reason of the connection of the opposite ends of the tire encircling member 24 with the arms 1 and 14, it will be obvious that pivotal movement of the same with relation thereto will be permitted and consequently, that the various parts of the guard may be readily shifted to open or close positions, the former being shown in the Figure 2, while the latter is shown in the Figure 1. The arrangement of the pivot pins 27 and 28 in their respective sleeves of the member 24, however, is preferably such as will permit of removal of the same therefrom whereby a tire encircling member of different size may be substituted therefor. By this expedient, it will be understood that the improved guard may be equally well used upon tire differing in size by the mere replacement of the tire encircling member 24 with another member of proper size.

In order that the tire encircling member may be firmly engaged about or over the tire, I may and preferably do form a curve 29 in the inner end of the fixed or immovable arm 1 so that it may snugly engage over the correspondingly curved side portion of the rim 23. Also, to effect positive engagement of the outer side of the right angularly formed arm 14 between the marginally disposed strips 3, guide pins 30 and 31 are preferably provided, the guide pin 30 being arranged upon the inner side of the lock cylinder and adapted to be slidably received in a correspondingly located opening 32 formed in an adjacent portion of the arm 14, while the pin 31 is arranged upon the lower portion of the inner side of the bearing sleeve 2 and is adapted to be slidably received in a correspondingly located opening 33 also formed in the adjacent side of the arm 14. Thus, it will be understood that with swinging of the arm 1 to its closed position, the outer side of the arm 14 will be snugly received in the pocket afforded by the marginally disposed strips 3 and in consequence, that it will be permitted to lie flush adjacent the inner side of said arm 1 thereby preventing tampering with the mechanism of the lock or the exposure of such mechanism to dirt, dust or the elements.

In using the improved tire guard, the arm 1 and the tire encircling member 24 are swung to their open positions as shown in the Figure 2. At this time, the tire encircling member 24 is swung upwardly in order that the arm 1 may be brought into engagement with the inner side of said arm 14, thus causing the hasp 15 to be received through the opening 11 in the lock cylinder 6 and engage with the spring pressed pivotal catch 9, said catch engaging the notched portion 16 on the hasp 15 and hence, preventing its removal without first disengaging the hasp. With upward or inward swinging movement of the tire encircling member 24, as above described, it will be understood that the curved seat 29 formed in the lower end of the arm 1 will engage with an adjacent portion of the carrier rim 23 and in consequence, that said encircling member as well as the arms 1 and 14 will be prevented from having relative upward movement with respect to the tire and spare rim over which the device is engaged. With movement of the parts of the device to their closed positions, the tie-bolt 22 is passed through the opening 5 in the arm 1 into engagement with the threads of the opening 20 in the outer side of the arm 14. This latter, as hereinbefore noted, serves to remove a material portion of strain which would be normally directed upon the mechanism of the lock and in consequence, will add to the durability and practicability of the device. To open the device, it is only necessary that a properly fitted key be inserted in the key way of the rotatable valve 7, whereupon such valve will be rotated in a direction to cause engagement of the cam 8 with the bearing portion 11 of the spring pressed pivotal catch 9. With such engagement of the arm 8, the outer end of the catch 9 will be moved upwardly, thereby disengaging the notched portion 16 from the inner end of the shank 15 and permitting the latter to be freely withdrawn from way 13.

Manifestly, the construction shown is capable of considerable modification and such modification as is within the scope of my claims, I consider within the spirit of my invention.

I claim:

1. A tire guard comprising an arm having a sleeve in one portion thereof, a lock in said sleeve, a substantially right angular arm having a hasp thereon adapted to be received in said lock, and a tire encircling member detachably pivoted at its opposite ends to adjacent portions of said arms.

2. A tire guard comprising an arm having a bearing sleeve formed in one portion thereof, locking mechanism received in said sleeve, a substantially right angular arm having a laterally extending hasp thereon engageable in said locking mechanism, marginally disposed strips formed adjacent said first arm adapted to snugly receive the corresponding side of said right angular arm therebetween, and a semi-circular tire encircling member detachably pivoted at its opposite ends to the adjacent extremities of said arms.

3. A tire guard comprising an arm having a bearing sleeve formed in one portion thereof, locking mechanism received in said sleeve, the inner end of said arm having a curved seat formed in its inner side, reenforcing webs formed integral with the lower portions of the opposite sides of said arms, a substantially right angular arm carrying a laterally extending hasp on one portion thereof adapted to be engaged with said locking mechanism, reenforcing webs formed integral with the opposite sides of said right angular arm, a downwardly curved extension upon the inner portion of said right angular arm, and a tire encircling member detachably pivoted at its opposite ends to the inner end of said first arm and the free extremity of the extended portion of said right angular arm.

4. A tire guard comprising an arm having a bearing sleeve formed in one portion thereof, locking mechanism received in said sleeve, the intermediate portion of said arm having an opening formed therein, the lower end of the arm having a curved seat formed upon the inner side of the same, a substantially right angular arm, a laterally extending hasp carried upon one portion of said arm receivable in said locking mechanism, said right angular arm having a downwardly curved extension formed on the inner end thereof and a screw threaded opening formed in the outer of its right angular portions alignable with the openings in the intermediate portion of said first arm, a tie-bolt received through said aligned openings for effecting a coupling between the several arms, and a tire encircling member detachably pivoted at its opposite ends to the inner end of said first arm and to the free end of the downwardly curved extension of the right angular arm.

5. A tire guard comprising an arm having a laterally disposed bearing sleeve formed in one portion thereof, a lock cylinder immovably received in said sleeve having portions of the same cut away, a rotatable valve in one of said cut away portions carrying a cam like extension upon its inner end, a spring pressed catch pivotally mounted in the remaining cut away portion of said cylinder, adapted to have one end thereof engaged, at times, by said cam-like extension, the forward portion of said cylinder having a way formed therein communicating with the cut away portion receiving said pivotal catch, the lower end of said arm having a curved seat formed in its inner side and an opening formed in the intermediate portion of the arm, a substantially right angular arm, a laterally extending shank carried upon one portion of said arm receivable in the way formed in said cylinder, said portion of the right angular arm also having a screw threaded opening therein alignable with the opening in the intermediate portion of the first arm, a tie-bolt receivable in said aligned openings for effecting a connection between the several arms, a downwardly curved extension formed upon the inner extremity of said right angular arm, and a tire encircling member detachably pivoted at its opposite ends to the inner end of said first arm and to free end of said downwardly curved extension of the right angular arm.

In witness whereof I have hereunto set my hand.

ORIN CLARENCE RUSSELL.